| United States Patent [19] | [11] | 4,414,239 |
|---|---|---|
| Oven | [45] | Nov. 8, 1983 |

[54] TOPPING COATING

[75] Inventor: Judith L. Oven, Banbury, England

[73] Assignee: General Foods Limited, Banbury, England

[21] Appl. No.: 348,909

[22] Filed: Feb. 16, 1982

[51] Int. Cl.³ ............................................. A23G 3/00
[52] U.S. Cl. ................... 426/607; 426/613; 426/101; 426/307; 426/306; 426/659
[58] Field of Search ............ 426/101, 613, 607, 306, 426/307, 659

[56]  References Cited

U.S. PATENT DOCUMENTS

| Re. 30,722 | 8/1981 | Olds | 426/306 |
|---|---|---|---|
| 3,784,714 | 1/1974 | McReynolds | 426/306 |
| 3,959,516 | 5/1976 | Warkentin | 426/306 |
| 4,017,645 | 4/1977 | Ziccarelli | 426/613 |

Primary Examiner—Jeanette M. Hunter
Attorney, Agent, or Firm—Joyce P. Hill; Daniel J. Donovan; Thomas R. Savoie

[57] ABSTRACT

A dessert composition is prepared which is pourable at ambient temperature, but hardens to a smooth, brittle, edible coating when applied to a frozen dessert comprising from 50% to 65% by weight of a mixture of a major proportion of a first vegetable oil melting below 5° C. and a minor proportion of a second vegetable oil melting above 20° C., from 10% to 35% by weight of a finely-divided sugar and from 5% to 20% by weight of a dried milk powder.

13 Claims, No Drawings

TOPPING COATING

DESCRIPTION

TECHNICAL FIELD

This invention relates to a dessert composition which is pourable at ambient temperature but hardens to a brittle edible coating when applied to a frozen dessert.

BACKGROUND ART

A composition of this kind, described in British Patent Specification 1,574,286 comprises from 44% to 53% refined edible oil that is substantially entirely liquid at 21.1° C. (70° F.), from 28% to 38% sugar, optionally up to 9% milk solids, from 4% to 10% corn syrup solids and lecithin, from 1.8% to 2.4% hard crystallized emulsifier, from 0.4% to 1.7% moisture, and the remainder flavoring additives. A product according to this patent has been marketed, but suffers from various disadvantages; it is formulated using hydrogenated and fractionated oils which are rather expensive; it requires a specialized hard crystallized emulsifer to achieve rapid hardening; the solids in the composition tend to settle out of suspension, so the product requires extensive shaking or stirring prior to use; it is not readily pourable at temperatures much below 20° C.; and it does not have a smooth mouthfeel (primarily due to the presence of course particles). It is an object of the present invention to provide a dessert composition which overcomes these disadvantages.

DISCLOSURE OF INVENTION

The present invention provides a dessert composition comprising from 50% to 65% by weight of a mixture of a major proportion of a first vegetable oil melting below 5° C. and a minor proportion of a second vegetable oil melting above 20° C., from 10% to 35% by weight of finely divided sugar, and from 5% to 20% by weight of dried milk powder, the composition being pourable at 19° C. onto a frozen dessert to form thereon a brittle edible coating.

The presence of water in the formulation affects the viscosity and stability. Water is, therefore, preferably substantially absent; the moisture content should preferably be not more than 1% by weight.

It is an advantage of this invention that compositions can be formulated using ordinary refined vegetable oils, without the need to use more expensive hydrogenated or fractionated oils. The oil used comprises a blend of a major proportion of a first vegetable oil melting below 5° C., preferably below 0° C., such as refined cotton seed oil, soya bean oil or ground nut oil; with a minor proporton of a second vegetable oil melting above 20° C., such as refined coconut oil, palm kernel oil, or some other lauric-acid-based oil. Dilatation tests indicate that the solids index (percentage of solids) of the oil blend should preferably be in the range 20% to 30% at 0° C. to provide a brittle coating; and not more than 4% at 19° C. so that the composition shall be pourable. If the proporton of the first (low melting) oil is too high, then the composition may not set satisfactorily to a brittle solid at 0° C.; if too low, the composition may not be pourable at the desired temperature. For a composition designed to be pourable at 19° C., it is possible to use as little as 50% of the first oil, a range of 50% to 80% of the first oil with from 50% to 20% of the second oil being preferred. A preferred composition which is pourable at 17° C. contains 60% to 70% of the first oil, preferably cottonseed oil, together with from 30% to 40% of the second oil, preferably coconut oil. Mixtures of oils in a group may be used.

Any dry sugar may be used in the composition; for example; sucrose, dextrose, fructose, or glucose or maltose syrup solids, or a mixture of such sugars.

In a coating composition of this kind, it is important that its viscosity should be sufficiently high during the formation of the coat to prevent run-off before setting is complete. The physical chemistry of the improved 'coatability' and increased rate of setting of this composition over the oil blend alone is not fully understood, but is probably related to its fat nucleation capacity, and the higher viscosity of the composition on account of its solids content and particle size. The presence of dried milk solids is also important to the final texture of the composition after pouring and coating a frozen dessert, providing a smoother mouthfeel, than otherwise. A preferred range of dried milk solids is from 10% to 20% by weight. Coloring and flavoring ingredients may be included in conventional amounts. For example, cocoa solids also to be finely divided, may be included in amounts typically up to 10%, preferably 4% to 8% by weight. Preservatives may be included. Emulsifiers may be included, but are not required.

BEST MODE FOR CARRYING OUT THE INVENTION

Compositions of the present invention may readily be made by warming the vegetable oil blend, adding the dry ingredients with continuous stirring, and passing the mixture through a ball mill or other suitable mill under conditions to produce a desired particle size. The solids particle size in chocolate is typically 20 to 40 microns in diameter, and compositions with a solids particle size in this range are satisfactory if used immediately. However, they tend to settle out on storage. It is therefore preferred to continue milling until an average solids particle has a diameter size below 20 microns, typically in the range 1 to 10 microns. It is found that compositions according to the invention in which 50% of the particles have a diameter less than 5 microns, are storage stable over long periods without showing any significant tendency to settle out, and have a particularly smooth mouthfeel.

Alternatively, the dry solids, particularly, for example, sugar and cocoa solids may be dry-ground separately, preferably under cryogenic conditions and then added to the oil blend. The final composition, however, should be such that the solids average particle size is still below 20 microns in diameter.

In practice, this composition dependent upon solids content and actual particle size may have rheological properties which are influenced by the rate of shear in some commercial machine filling operations, e.g., piston-orifice, such that there is some permanent loss of viscosity. This effect may, however, be compensated by filling at a slightly elevated temperature (about 40° C.) into containers, from which the composition is to be eventually dispensed, and allowing the temperature to fall to ambient.

EXAMPLE

The following example illustrates the invention.

| Example | By Weight |
| --- | --- |
| Refined cottonseed oil | 39% |
| Refined coconut oil | 21% |
| Sugar | 24% |
| Cocoa solids | 6% |
| Dried Skimmed Milk | 10% |

The cottonseed and coconut oils were mixed, melted and heated to 30° C. The sugar, cocoa solids and dried skimmed milk were added with continuous stirring. The mixture was passed through a ball mill until 60% of the particles were less than 5 microns in diameter (by direct particle measurement).

The resulting composition is storage stable over an extended period, without appreciable settling out of the solid components. It is pourable at 17° C., nd when poured onto ice cream rapidly solidifies thereon to form a brittle solid coating that has a smooth texture similar in appearance and taste to milk chocolate confectionery.

What is claimed is:

1. A dessert composition which is pourable at 19° C. but hardens to a smooth, brittle, edible coating when applied to a frozen dessert consisting essentially of from 50% to 65% by weight of a mixture of non-hydrogenated and non-fractionated vegetable oil having a solids index from 20% to 30% at 0° C. and not more than 4% at 19° C. wherein a major proportion of said mixture melts below 5° C. and a minor proportion melts above 20° C.; from 10% to 35% by weight a finely-divided sugar; and from 5% to 20% by weight of a dried milk powder.

2. The composition of claim 1 wherein the first vegetable oil is selected from the group consisting of cotton seed oil, soya bean oil and ground nut oil.

3. The composition of claim 1 wherein the second vegetable oil is selected from the group consisting of coconut oil, palm kernel oil, and lauric-acid based oil.

4. The composition of claim 1 wherein the finely-divided sugar is in particles having a diameter of less than 20 microns.

5. The composition of claim 1 or 4 wherein the sugar is selected from the group consisting of sucrose, dextrose, fructose, glucose, maltose and mixtures thereof.

6. The composition of claim 1 wherein the dried milk powder is used in an amount of from 10% to 20% by weight.

7. The composition of claim 1 wherein on a weight basis 39% cottonseed oil, 21% coconut oil, 24% sugar, 6% cocoa solids and 10% dried skimmed milk are mixed to form a storage-stable coating.

8. A process for preparing a dessert composition which is pourable at ambient temperature, but hardens to a smooth, brittle, edible coating when applied to a frozen dessert, which comprises the steps of:
   (a) warming and blending a mixture of non hydrogenated and non fractionated vegetable oil having a solids index from 20% to 30% at 0° C. and not more than 4% at 19° C., a major proportion of said mixture melting below 5° C. and a minor proportion melting above 20° C.,
   (b) adding dry solids, with continuous stirring, including 10% to 35% by weight of a finely-divided sugar and from 5% to 20% by weight of a dried milk powder,
   (c) passing the mixture of step (b) through a mill until the solids average particle size is less than 20 microns in diameter.

9. The process of claim 8 wherein the first vegetable oil is selected from the group consisting of cotton seed oil, soya bean oil and ground nut oil.

10. The process of claim 8 wherein the second vegetable oil is selected from the group consisting of coconut oil, palm kernel oil, and lauric-acid based oil.

11. The process of claim 8 wherein 60% of the dry solids particles are less than 5 microns in diameter.

12. A dessert composition as claimed in claim 1, wherein the mixture of vegetable oils is present in a proportion of from 55% to 65% by weight and the finely-divided sugar is present in a proportion of from 10% to 30% by weight.

13. A dessert composition as claimed in claim 1, wherein the mixture of vegetable oils consists of 50% to 80% of the first oil with from 50% to 20% of the second oil.

* * * * *